Figure 1:
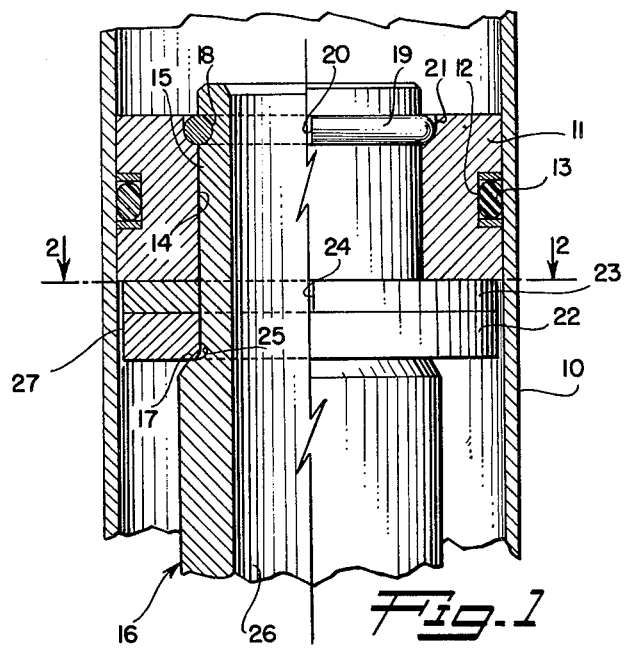

INVENTORS
ALFORD K. STEWART
ROGER A. KEECH

By R. E. Geauque
Attoney 3,047,343
RETAINING DEVICE
Alford K. Stewart, Burbank, and Roger A. Keech, Glendale, Calif., assignors to Menasco Manufacturing Company, Burbank, Calif., a corporation of California
Filed Feb. 8, 1960, Ser. No. 7,340
1 Claim. (Cl. 308—3)

This invention relates to a retaining device and more particularly to a device for retaining a piston head or sleeve bearing on a shaft.

In present type of actuators, the end of the actuator shaft carrier a piston head which closely fits in the actuator cylinder and the piston head carries a sealing ring to prevent passage of fluid between the head and the interior wall of the cylinder. Also, in certain other apparatus, it is necessary to secure a sleeve bearing to the end of a shaft located within a cylinder. Any device for securing a piston head or sleeve bearing to the end of a shaft requires that longitudinal movement between the parts be restrained.

In the past, it has been the practice to attach such parts to a shaft by threaded connections comprising threads of sharp curvature which are subject to failure because of high stress concentration. Pins or bolts have also been utilized for connecting these parts and failure can occur from shearing of the bolts or pins. One form of device for eliminating threaded and pin connections is shown in U.S. Patent No. 2,829,930 granted April 8, 1958 to J. B. Beach. This device requires that the piston head or bearing be split into two parts and that each part be machined to receive one of the two retaining rings required to secure the two parts. Also, the end of the shaft must contain two grooves, one for each of the retaining rings. The present invention provides a retaining device which is simpler to construct and easier to assemble.

In the present invention, the end of the shaft is reduced in diameter to provide an offset shoulder serving as a stop for an annular ring, which is simply slipped onto the shaft. The piston head or bearing carried by the shaft is fabricated as a single member and is also simply slipped onto the shaft. A single retaining ring at the end of the shaft, along with the offset shoulder, secures the complete assembly after a split ring is inserted between the annular ring and the single member which comprises the piston head or sleeve bearing. With this construction, the complete retainer assembly is free to rotate on the shaft.

It is therefore an object of the present invention to provide a retaining device for securing a head or sleeve to the end of a shaft by employing an offset shoulder on the shaft and a single retaining ring.

Another object of the invention is to provide a retaining device for securing a single sleeve member to the end of a shaft, which sleeve can serve as a piston head or sleeve bearing.

Another object of the invention is to provide a retaining device for securing a single member to a shaft by utilizing an offset shaft shoulder, an annular ring and a split ring to confine the member in one direction and a retaining ring to confine the member in the other direction.

Figure 2:
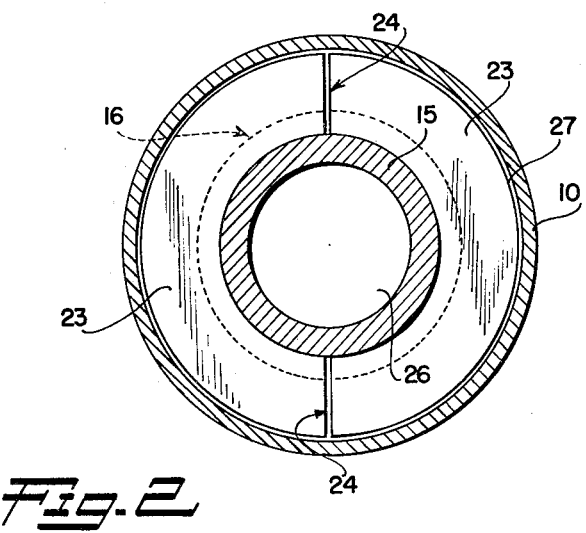

These and other objects of the invention not specifically set forth above will become readily apparent from the accompanying description and drawings in which:

FIGURE 1 is a vertical section, partly in elevation, of a piston head secured to the end of a shaft by use of the present invention; and FIGURE 2 is a horizontal section along lines 2—2 of FIGURE 1 showing the split ring for securing the parts in assembled position.

Referring to the embodiment of the invention chosen for illustration in FIGURES 1 and 2, a cylinder 10 contains a circular piston head 11 having a sliding fit with the interior of the cylinder. The piston head 11 is formed as a single member and contains a groove 12 in its outer circumference which confines a sealing ring 13 so that fluid cannot pass from one side of the piston head to the other. The piston head 11 has an interior circular opening 14 which receives the reduced end 15 of a shaft 16. A shoulder 17 is provided on shaft 16 as a result of the reduced size of end 15, and the end 15 also contains a semi-circular groove 18 for receiving a circular retaining ring 19 which is split at space 20. The head 11 contains an annular cut-out portion 21 which can also receive a part of the retaining ring 19 when the ring is located in groove 18. An annular ring 22 abuts the shoulder 17, and a ring 23, split along lines 24, is located between the head 11 and the annular ring 22 when the piston head 11 is fully assembled on the end of shaft 16 with the retaining ring 19 in place. A relief 25 is located in shaft 16 adjacent shoulder 17 to relieve stress concentration.

In assembling the piston head 11 on the shaft 16, the annular ring 22 is first positioned adjacent the shoulder 17 and the end 15 of the shaft 16 is then inserted into the opening 14 in the piston head 11. The piston head 11 is moved into abutment with the annular ring 22 and the retaining ring 19 is then positioned in the groove 18. Thereafter, the piston head 11 is moved toward the end of the shaft so that the cut-out portion 21 receives part of the retaining ring 19, and the sections of split ring 23 are then placed onto the end 15 between the piston head 11 and the annular ring 22. The assembly is then in condition for the sealing ring 13 to be installed in groove 12 in piston head 11 and for insertion of the complete piston head and shaft into the cylinder 10. The annular ring 22 can be of sufficient size and strength to retain the member 11 in position although only a portion of the ring engages the offset shoulder. Also, the presence of ring 22 permits the split ring 23 to be solely in compression between member 11 and ring 22.

The present invention provides a retaining device which can be utilized to quickly and securely assemble a piston or a sleeve bearing on a shaft and thereafter prevent any longitudinal movement of the member with respect to the shaft under axial loads and transverse loads. It is apparent that the slot 12 and sealing ring 13 can be eliminated from member 11 when the member 11 serves as a sleeve bearing to resist transverse forces between the cylinder and the shaft. While the shaft 16 could be solid, the shaft preferably contains the axially extending interior opening 26 to reduce the weight of the shaft while still providing sufficient strength. Further, it is apparent that the annular ring 22 and split ring 23 need not be accurately machined on the outer circumference since a space 27 exists between each member and the interior of the cylinder 10. Obviously, the retaining ring 19 and the split ring 23 can assume various shapes and can be formed of one or a plurality of pieces and the shoulder 17 could be replaced by any suitable stop means extending outwardly from the end of a shaft, whether or not the end is reduced in size. Also, the annular ring 22 could be optional in constructions in which the split ring alone would provide sufficient strength. Various other modifications are contemplated by those skilled in the art without departing from the spirit and scope of the invention as hereinafter defined in the appended claim.

What is claimed is:

In combination, a cylinder, a shaft located within said cylinder, a retaining end portion on said shaft of reduced diameter, an offset shoulder on said shaft connecting one end of said end portion with the remainder of said shaft, a single circular member having a close sliding fit in said cylinder, an annular groove on its outer surface adapted to receive an annular resilient member coactive with the bore of said cylinder for sealing said single member relative to said bore of said cylinder and an opening for slidably receiving said end portion, an annular groove in the other end of said end portion, a split retaining ring partially contained within said annular groove and extending outwardly from said end portion, a grooved recess at one end of said single member for receiving and confining the extending portion of said retaining ring, an annular ring located adjacent said offset shoulder and having an outer diameter substantially smaller than said single member and substantially greater than said offset shoulder, and a split ring positioned between said annular ring and the other end of said single member for holding said grooved recess against the retaining ring and retaining said member in position on said end portion.

References Cited in the file of this patent

UNITED STATES PATENTS

| | | |
|---|---|---|
| 820,695 | Brammer | May 15, 1906 |
| 2,756,825 | Janiszewski | July 31, 1956 |
| 2,829,930 | Beach | Apr. 8, 1958 |